3,522,310
REMOVAL OF O-DIAMINES FROM AN ISOMERIC
MIXTURE OF TOLYLENE DIAMINES
James M. Cross and David H. Chadwick, New Martinsville, W. Va., assignors to Mobay Chemical Company, Pittsburgh, Pa., a corporation of Delaware
No Drawing. Filed Nov. 14, 1966, Ser. No. 593,627
Int. Cl. C07c 85/16, 87/58
U.S. Cl. 260—583                                6 Claims

ABSTRACT OF THE DISCLOSURE

Isomeric mixtures of tolylene diamines containing o-tolylene diamine are heated at a hydrogen pressure of from about 15 p.s.i.g. to about 200 p.s.i.g. for about one to two hours at a temperature of about 180° C. to about 270° C. in the presence of a catalyst known to bring about the hydrogenation of nitrobenzene to aniline to remove the o-tolylene diamine isomers from the isomeric mixture of tolylene diamines.

---

This invention relates to a method of removing o-diamines from an isomeric mixture of tolylene diamines and more particularly, to removing the o-diamines from an isomeric mixture of tolylene diamines wherein the 2,4- and 2,6-tolylene diamine isomers are predominant.

In the preparation of tolylene diamine by the nitration of toluene and the subsequent reduction of the dinitro compound to tolylene diamine, a small percentage of vincinal or o-diamines is formed. This percentage is on the order of 3 to 4 percent. When tolylene diamine is subsequently phosgenated with the intent to prepare tolylene diisocyanate, the o-diamines present react with phosgene resulting in cyclic ureas which are unwanted, tarry side reaction products. The presence of o-diamines in the isomeric mixture therefore decreases the yield of tolylene diisocyanate because the tarry masses entrain desired tolylene diisocyanate products; in addition, the o-diamines require an added amount of phosgene for their conversion, and reduce the volume of the reactors useful to production of the desired isocyanate.

It has been heretofore known to react isomeric mixtures of tolylene diamine with compounds such as urea which cause the o-diamines to react preferentially to form benzimidazolinones. These products can then be readily separated from the desired m-tolylene diamine isomers by distillation techniques. While this technique is very advantageous, it requires the additional expense of urea or another compound which will react to form the benzimidazolinones, and which results in the formation of additional residue to entrain or hold up the desired amine products.

It is therefore an object of this invention to provide an improved method of removing o-tolylene diamine isomers from an isomeric mixture of tolylene diamines. It is a further object of this invention to provide a method of removing o-tolylene diamine isomers from an isomeric mixture of tolylene diamine without the introduction of any foreign chemicals.

The foregoing objects and others which will become apparent from the following description are accomplished in accordance with the invention generally speaking by heating an isomeric mixture of tolylene diamines containing a small percentage of o-tolylene diamines at a hydrogen pressure of from about 15 p.s.i.g. to about 200 p.s.i.g. of hydrogen for about one to two hours at a temperature of about 180–270° C. in the presence of a catalyst known to bring about the hydrogenation of nitrobenzene to aniline. The isomeric mixture of tolylene diamines preferably containing from about 2% to about 5% of o-tolylene diamine and the balance m-tolylene diamine.

In the reaction described above, a process called hydrogenolysis occurs. In this reaction, an amino group of the diamine reacts with hydrogen with the formation of toluidine and ammonia, such as, for example,

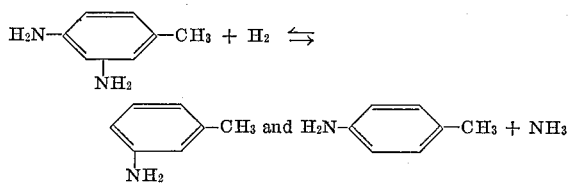

At the temperature and pressure recited above, hydrogenation of the benzene ring of m-tolylene diamines does not occur and the hydrogenolysis of the o-diamines occurs preferentially resulting in the effective removal of the o-diamines while only a very small percentage of the m-isomers are lost through hydrogenolysis. While the reaction shown above is depicted only for the 3,4-isomer, the same reaction occurs to the other isomers present, the o-diamines being transformed into toluidines preferentially. A small percentage of toluidines may be reduced to methyl aminocyclohexane in the process. The process of this invention is particularly suitable for those isomeric mixtures of tolylene diamines containing the m-tolylene diamines present as an 80/20 or 60/35 isomeric mixture of 2,4-tolylene diamine and 2,6-tolylene diamine.

In practising the invention, any suitable hydrogenation catalyst may be used such as, for example, nickel-kieselguhr, Raney nickel, Raney cobalt, cobalt oxide, a cobalt oxide-calcium oxide mixture, ruthenium, paladium, platinum, rhodium, a mixture of cobalt oxide-calcium oxide in sodium carbonate, ruthenium dioxide, sodium ruthenate on carbon, platinum oxide and the like.

The invention is further illustrated but not limited by the following examples in which parts are by weight unless otherwise specified.

EXAMPLE 1

About 400 parts of an isomeric mixture of tolylene diamines containing 97.1% of 2,4- and 2,6-tolylene diamine in a ratio of about 80/20 and about 2.6% of o-isomers and about 16 parts of Raney nickel are charged to an autoclave and purged with nitrogen and then 8 times with 100 p.s.i.g. hydrogen. The mixture is heated to about 230° C. at 200 p.s.i.g. hydrogen pressure and held for 2 hours. After removal of the charge from the autoclave, the catalyst is removed by filtration. The low boiling toluidines and reduced toluidines are removed by distilling off at a relatively low temperature. The residual tolylene diamine composition determined by vapor phase chromatography establishes the isomer ratios to be 98.9% of m-isomers and 1.2% of o-isomers.

EXAMPLE 2

A charge of 400 parts of an isomeric mixture of tolylene diamines containing 96.6% of 2,4- and 2,6-tolylene diamine in a ratio of about 80/20 and about 3.4% of o-isomers and a catalyst mixture consisting of 20 grams cobalt oxide, 30 grams of calcium oxide and 13 grams of sodium carbonate are placed in an autoclave. The charged autoclave is purged with nitrogen and then 8 times with 100 p.s.i.g. hydrogen. The mixture is heated to about 265° C. and 75 p.s.i.g. hydrogen pressure and held for 2 hours. After removal of the charge from the autoclave, the catalyst is removed by filtration. The low boiling toluidines and reduced toluidines are removed by distilling off at a relatively low temperature. The residual tolylene diamine composition determined by vapor phase chromatography establishes the isomer ratios to be 99.4% of m-isomers and 0.6% of o-isomers.

Although the invention has been described in considerable detail in the foregoing for the purpose of illustration, it is to be understood that such detail is solely for this purpose and that variations can be made by those skilled in the art without departing from the spirit and scope of the invention.

What is claimed is:

1. A method of reducing the o-diamine isomer content of an isomeric mixture of predominately m-tolylene diamines which comprises heating the isomeric mixture at a temperature of about 180° C. to about 270° C. for from about 1 to 2 hours at a hydrogen pressure of from about 15 p.s.i.g. to about 200 p.s.i.g. in the presence of a hydrogenation catalyst and recovering the m-isomers by removal therefrom of toluidines and reduced toluidines thus formed.

2. The method of claim 1 wherein the isomeric mixture of tolylene diamines contains from about 2 to about 5% of o-tolylene diamines and the balance m-tolylene diamines.

3. The method of claim 2 wherein the balance of m-tolylene diamines is present in the ratio of about 80% 2,4-tolylene diamine and 20% 2,6-tolylene diamine.

4. The method of claim 2 wherein the balance of m-tolylene diamines is present in the ratio of about 65% 2,4-tolylene diamine and 35% 2,6-tolylene diamine.

5. The method of claim 1 wherein the catalyst is Raney nickel.

6. The method of claim 1 wherein the catalyst is a mixture of cobalt oxide, calcium oxide and sodium carbonate.

References Cited

UNITED STATES PATENTS

| 3,134,813 | 5/1964 | Pelley | 260—582 |
| 3,270,058 | 8/1966 | Sutcliffe | 260—582 |
| 3,314,996 | 4/1967 | Luberoff et al. | |

CHARLES B. PARKER, Primary Examiner

R. L. RAYMOND, Assistant Examiner

U.S. Cl. X.R.

260—453